April 28, 1931. J. DE CHAPPEDELAINE 1,802,882
SUPPORTING AND PROPELLING APPARATUS BASED ON CENTRIFUGAL POWER
Filed Oct. 2, 1928   3 Sheets-Sheet 1
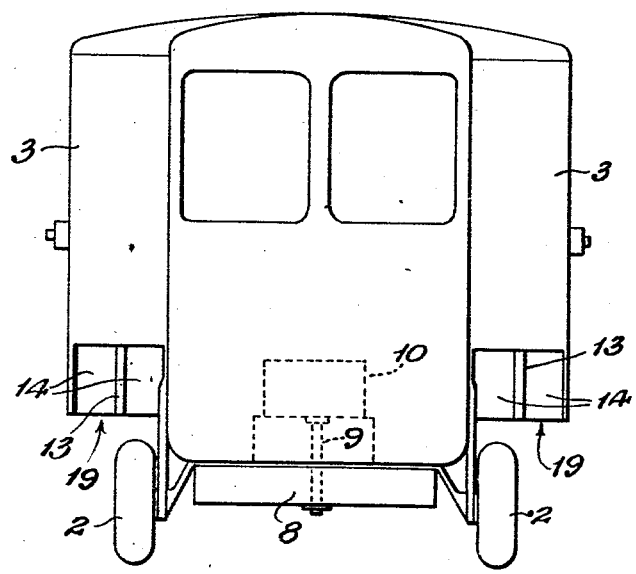
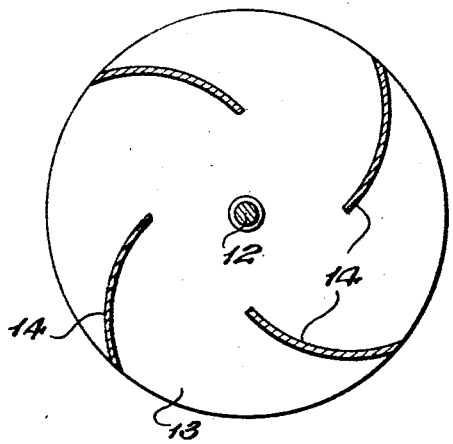
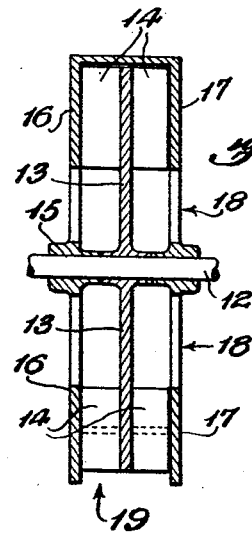
INVENTOR.
Jean de Chappedelaine.
BY
William C. Linton
ATTORNEY.

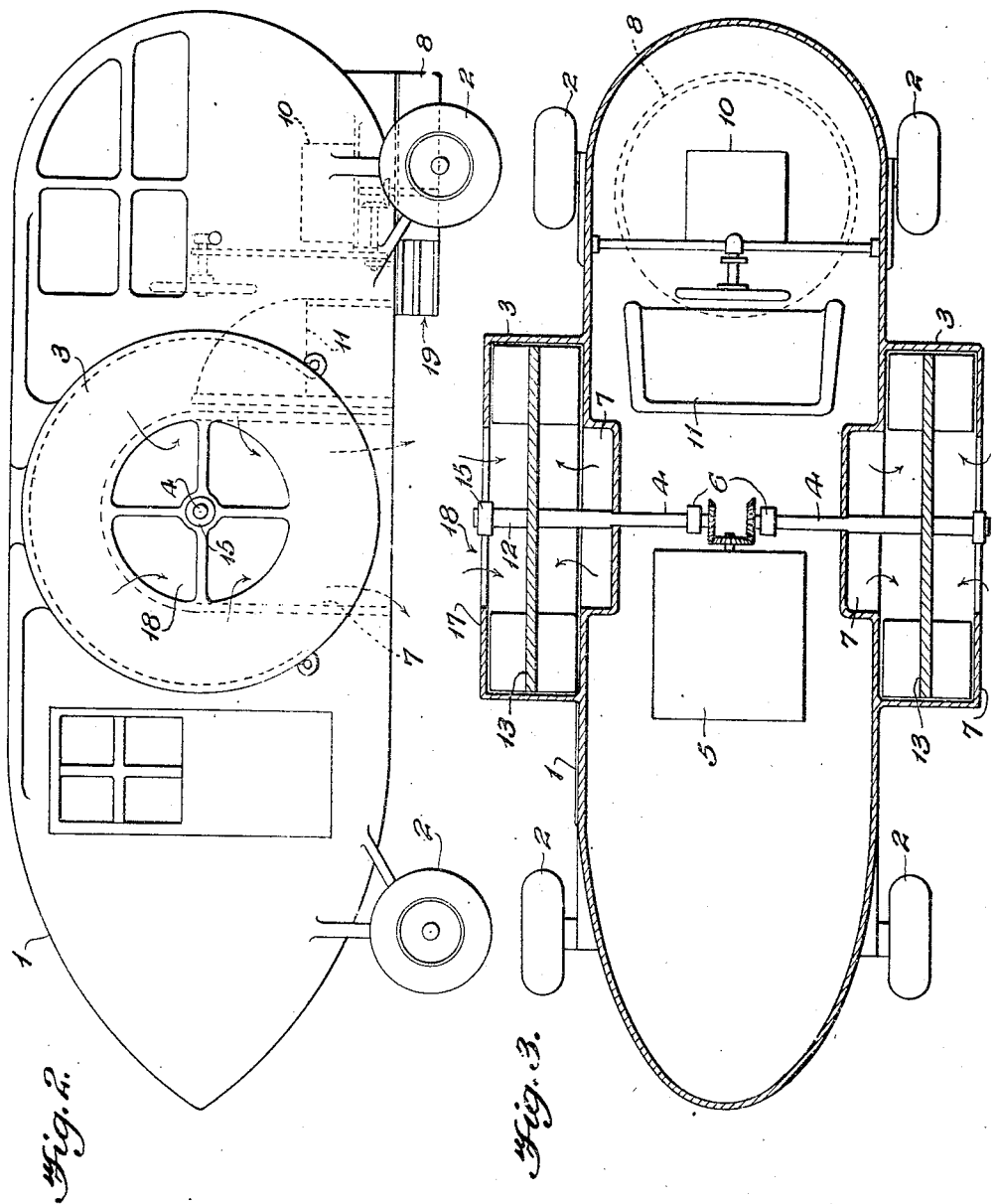

April 28, 1931.  J. DE CHAPPEDELAINE  1,802,882
SUPPORTING AND PROPELLING APPARATUS BASED ON CENTRIFUGAL POWER
Filed Oct. 2, 1928  3 Sheets-Sheet 3
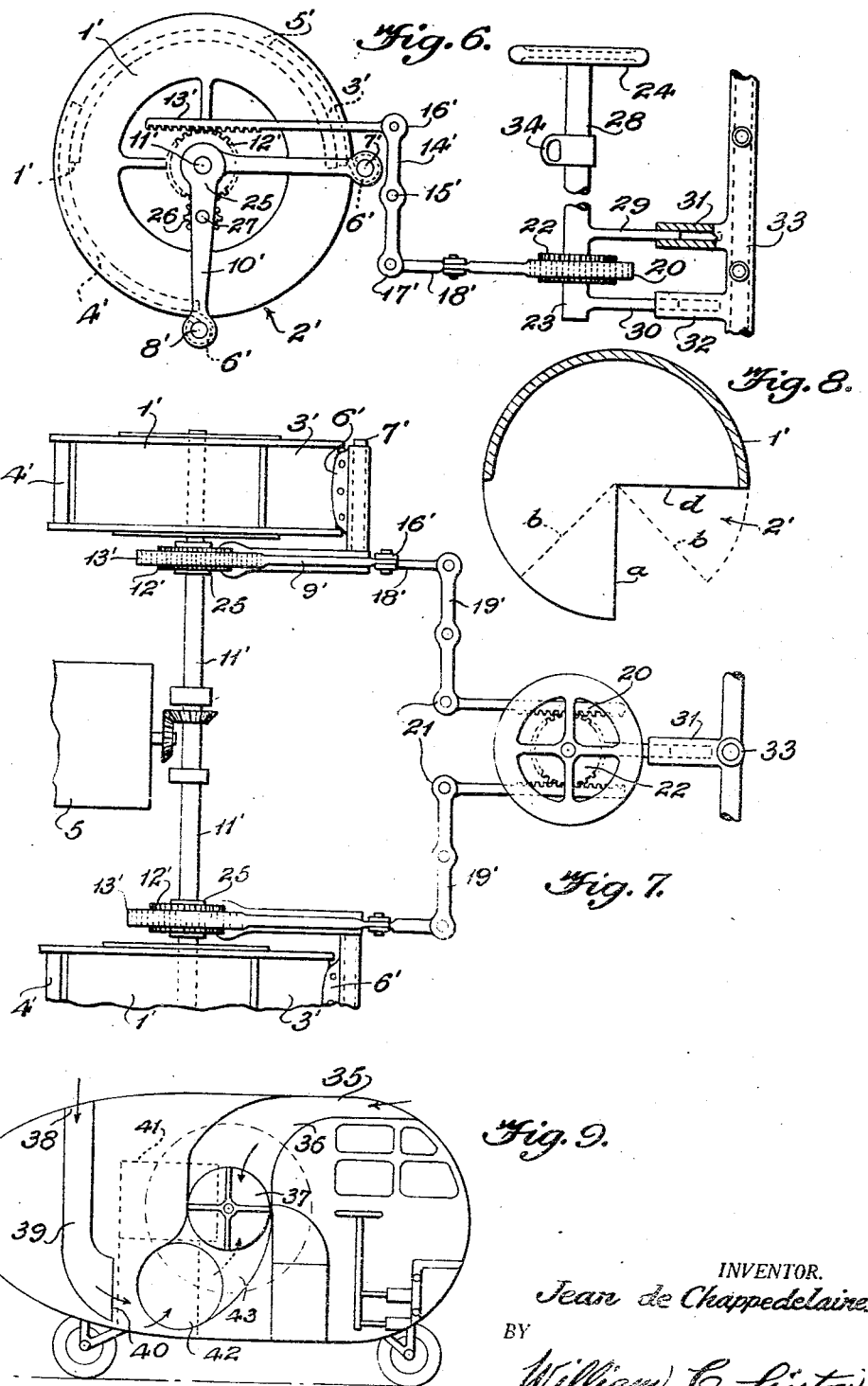
INVENTOR.
Jean de Chappedelaine
BY
William C. Sinton
ATTORNEY.

Patented Apr. 28, 1931

1,802,882

UNITED STATES PATENT OFFICE

JEAN DE CHAPPEDELAINE, OF PARIS, FRANCE

SUPPORTING AND PROPELLING APPARATUS BASED ON CENTRIFUGAL POWER

Application filed October 2, 1928, Serial No. 309,792, and in France December 10, 1927.

In the supporting apparatus generally known, such as those of the helicopter type or others, the essential principle which has served as a basis for their establishment is the reaction of a fluid mass as, for instance, air, set in motion by some means or other, on an appropriate surface resembling the wing of an aeroplane or the blade of a propeller.

The employment of this supporting power of the air demands the displacement of a large body, all the more considerable as the apparatus destined to move in the ambient medium is of a considerable weight in itself, and therefore when heavy weights are transported, large displacements of masses of air are made, which it is illusory to wish to provoke, in view of the low " massic " power of the motors at present in use.

To obviate this drawback under present conditions, it is possible to utilize the power of the centrifugal force of a mass of air set in motion at a very high speed, the working-point of which would be the supporting apparatus, the force being directed from base to top, allowing the apparatus either to rise by its own means or to combat the law of gravitation, or, finally, to control its direction or brake the descent.

The present invention is a supporting and propelling apparatus, characterized by the utilization of the centrifugal force of the fluid mass that it puts into motion, this fluid being drawn into attachments in the nature of turbines with horizontal axis, through central aspirating mouths, then drawn into a rotary movement by a system of paddles having an appropriate winding-surface, in such a way that a pressure results on the internal surface of the casing, thus creating at the same time as the reaction of the air on the paddles in the lower part of the stator, a resultant force which is utilized for supporting. A similar system of turbine but with a vertical axis, conceived in the same spirit, will be used for propulsion.

The apparatus above described was evolved in view of its application to aerial locomotion, in the solving of certain still unsolved problems, such as, for example, that of rising vertically above a certain point on land or on sea and remaining stationary during a determined time, at a given height, while still keeping the power of moving and guiding the aeroplane in any direction in the air and descending to earth or alighting on the sea, without damage to the apparatus owing to a brusque movement.

The description which follows, as well as the drawings annexed, refer to two forms of execution of the apparatus given as examples.

Fig. 1 represents the front view of the apparatus.

Fig. 2 is a longitudinal view of the apparatus.

Fig. 3 is a transversal section following the line A—A of the Fig. 1, showing the aspirating mouths as well as the aspirating channels of the lateral turbines.

Fig. 4 is an axial section through the air turbine.

Fig. 5 is a section B—B of Fig. 4 showing the arrangement of the vanes or the paddles of the rotor of the air turbine.

Fig. 6 is a longitudinal view of a control appliance for the mobile shields.

Fig. 7 represents the surface plan of this appliance.

Fig. 8 is a section A—A of Fig. 7 in the stator of a turbine, showing the position of the opening, corresponding to the supporting properly speaking, and, in dotted lines, the position of the shields in normal working order, i. e., supporting and propulsion.

Fig. 9 is a drawing representing the suction channels both fore and aft of the turbines in the interior of the body, which lead to the aspirating mouths nearest to the centre of the cabin.

The apparatus shown in Figs. 1 to 5 consists of a body (1) forming a cabin. This body is built in such a manner as to cause the least possible resistance to flight and rests on the wheels (2), which in their entirety constitute the landing gear. The air turbines (3) are placed at each side of the body, with horizontal axis (4), which can be mounted on the apparatus in the two following manners: either the stator of these turbines should form a whole with the body, the rotor and the moveable parts of the turbine being flanged into the stator, or the turbines can be fixed, after being mounted, to the walls of the body.

The driving shafts of the lateral turbines (3) are worked by an engine (5) of such power that it allows the rotor of the turbines to revolve at a very high speed, capable of creating such a resultant of centrifugal force that the apparatus is rendered capable of rising in the air. The connection between the motor and turbines is assured by an arrangement of attachments permitting, on the one hand, the air turbines to revolve each in an opposite direction, and, on the other hand, to keep the turbines independent of the motor by automatic disconnecting gear (6).

Opposite the interior surface of the turbines and against the lateral walls of the body are placed air suction channels (7) having an outlet in the floor of the body. The propulsing agent of the apparatus is formed by an air turbine (8) of the same kind as the turbines (3), but having a vertical axis (9).

This turbine (8) is run by a motor (10), fixed at the end of the shaft (9), or on any other connecting attachment. Between the turbine (8) and the motor (10) is interposed the steering attachment worked by the pilot seated on seat (11). This steering attachment may be constituted by an assemblage of bevel gear and gearing by chain, one of the toothed wheels of which being wedged in on the supporting axis of the steering wheel.

The supporting and propelling turbines comprise a shaft (12) supporting one or several disks (13), to which are fixed vanes (14) of a suitable shape. The shaft (12) rests on bearings (15), one of which is fixed to the flange (16) of the stator, which takes the form of the rotor, and the other bearing (15) forming part of the other flange (17) of the stator, is fixed in the centre of a suitable air-tight packing. The flange (17) of the stator is pierced by openings (18) suitably placed, forming the aspirating mouths of the air turbine. The lower part of the gear-case shows an opening (19) for the escape of the waste air from the turbine.

The working of the apparatus, which is described in its essential elements is as follows:

To start the apparatus, the motors are set in motion. As soon as the lateral turbines are in full revolution, the air is sucked in through the central aspirating mouths and carried along by the vanes of the rotors in their rotary movement. The air pressure on the interior surface of the casings resulting from the centrifugal force of the mass of air in rotary movement, the reaction of the air on the blades in the open part of the stator, combine to give a resultant force which is utilized according to circumstances for supporting or propelling purposes. To ensure the propulsion or the guiding of the apparatus, recourse is had to the air turbine placed in the lower fore part of the body. This turbine can be governed and manœuvred by means of a steering wheel from the pilot's seat. By directing the opening (19) to the right or to the left, in the direction in which the aeroplane is travelling, the supporting apparatus is turned in the desired direction. When the orientation reaches 180°, the line of direction of the apparatus is reversed. This brakes the aeroplane and the backward movement is obtained.

The principal advantages of this aerial apparatus are the following: It can rise vertically above a given point and remain stationary in the air at a given point during a determined time. The revolving parts being animated by a very high rotary speed ensure gyroscopic stability. In the case of a breakdown of the engine, the various supporting apparatus, being provided with automatic disconnecting gear, continue to revolve for a certain time owing to the force they have acquired and the power stored up, thus allowing the machine to land.

This property gives a certain security, as it obviates the sudden descent of the apparatus in the case of a chance stoppage of the engine. In addition, in view of the principle on which the invention is based, the overloading of the apparatus can be reduced to the minimum. Finally, the absence of planes facilitates the landing on overcrowded landing places and considerably reduces the space necessary for the housing of the machine.

In the second method of execution (Figs. 6 to 9) the apparatus consists of a number of appliances intended to render its employment more practical and especially to ensure:

1. The supporting and propulsion in all azimuths by one single kind of turbine, with a horizontal axis placed in the centre or on the lateral surface of the body, provided with a system of mobile shields the latter being regulated by the pilot's steering wheel, and regulating the exit of air from the turbines through the openings mentioned in the first form of execution.

2. The security of the engine by:

a. the increase in the axial dimensions of the turbines with horizontal axis, while preserving their radial dimensions, b. the addition to the system of control of the mobile shields, mentioned in par. 1, of an appliance which permits of the rapid opening of the most favourable opening for the waste air from the turbines, in such a way that, in the case of a breakdown of the motive power, the fullest advantage can be taken of the Magnus effect or automatic rotation of the paddles brought about by the resistance of the air.

3. The improvement in the efficiency of the apparatus by:

a. a channel for the suction of air from the turbines placed in the interior of the body, connected with the exterior by openings made in the fore part of the cabin ceiling, in order to utilize either for supporting or propulsion the depression of air produced by the rotation of the turbines, lessening the resistance to flight and ending in the aspirating mouths of the turbines which have an outlet in the interior of the body.

b. an extra aspirating pipe for air from the turbines, which serves at the same time to cool the motor, the air aperture for which is situated in the rear part of the ceiling, and which makes a circuit through a funnel and discharges at a proper distance on that part of the motor having the hottest temperature. After having passed over the walls of the motor, the air is sent through a channel into the same aspirating mouths as those defined in (a).

Following this form of execution, the stator (1') of a turbine consists, as in the first form of execution, of an opening (2') on its lower half circle (Fig. 8). Two mobile shields (3') and (4') (Fig. 6) slide into grooves (5'), which are formed with the periphery of the flanges of the stator. To the shields (3') and (4') are fixed respectively rolled sheet iron (6'), which serves as a support to the axes (7') and (8'), fixed to the connecting rods (9'), and (10'). The connecting rods (9') and (10') can pivot round an axis (11'), situated in the prolongation of the axis of the turbines. In this manner the axes (7') and (8') are displaced on portions of the circumference during the manœuvring of the shields.

For this purpose, the connecting rod (9') is provided at its pivotal extremity with a toothed wheel (12), centred on the axis (11'), the teeth of this wheel being caught in by a rack (13'), fixed to a lever (14'), situated in the vertical plane. This lever (14') oscillates in its medium around an axis (15') and is articulated at one of its extremities by means of a fork (16') (Fig. 7) to the rack (13'), and at the other extremity, by means of a fork (17'), to the extremity of the coupling bar (18'), which is articulated at one of its extremities by a lever (19') of the same kind as the lever (14'), but situated in the horizontal plane. A rack (20'), identical with the rack (13') is articulated at (21) to the other extremity of the lever (19'), and is caught up by the toothed wheel (22), set in motion by the directing axis (23) of the steering wheel (24) of the pilot (Fig. 6).

The commanding rod (10') of the shield (4') also pivots, as stated above, on the axis (11'). For this purpose, it is provided with a fork (25), inside which the toothed wheel (12') can turn freely, the latter being caught in by a pinion (26) fixed on an axis (27), also supported by the two arms of the fork (25).

This gearing is for the purpose of coordinating the control of the shields (3') and (4'), while, by means of a system of flexible transmission fixed to axis (27), which starts at the pilot's seat (not shown in the drawing) the angle of distance between the two connecting rods (9') and (10') can be varied according to the necessities arising in the piloting of the machine.

This construction is repeated symmetrically with regard to the longitudinal axis of the body, as indicated in Fig. 7 for the control of the turbines situated in the opposite wall of the body.

This control of the mobile shields may be modified for reasons of construction so that the racks, instead of catching the toothed wheels placed in the axis of the turbines by the upper horizontal tangent line may occupy any suitable position on condition of their being always tangent to a spoke of the toothed wheel.

The controlling axis (23) is enclosed in a tube (28), to which are fixed two bars (29) and (30), in tubular form, for instance, on either side of the toothed wheel (22). The bars (29) and (30) slide by hard friction into the sheaths (31) and (32), fixed to the body (33), and are situated on the same vertical plane. A handle (34) is fixed to the tube (28) at a certain distance from the steering wheel (24), intended to facilitate the sliding of the bars (29) and (30) into the sheaths (31) and (32).

The working of the control of the mobile shields is the following:

When the apparatus is at rest, and in consequence the engine stopped and the landing gear touching the ground, the shields are placed in the position best adapted to afford the greatest degree of supporting to allow of the machine leaving the ground. (Position a—a of the connecting rods shown in Fig. 8.) In order to modify this state of pure supporting, once the machine has left the ground, and in order to pass imperceptibly to propulsion (position b—b of Fig. 8 in dotted lines), the pilot only needs to push his control stick forward as far as possible, making use of the handle (34). The bars (29) and (30) then slide into their sheaths (31) and (32), carrying with them the toothed wheel (22) and the two racks (20) which are caught in by the wheel.

If circumstances require it, it is possible to make an inverse manœuvre and draw the control stick towards oneself, which gives a retrograde movement to the apparatus.

For veering, it is only necessary for the pilot to turn his steering wheel in the direction defined by the inward veering. This manœuvre results in making the shields turn in opposite directions on each of the groups of turbines at right and at left of the body.

Another modification of the first form of execution consists in suppressing the air suction of the turbines through the floor of the body by replacing it by two canalizations having separate circuits, but both ending in the aspirating mouths of the turbines having an outlet in the interior of the body.

The first of these circuits starts from the fore part of the ceiling of the body. An opening (35) (Fig. 9) allows the air drawn in by the turbines to traverse the channel (36), situated inside of the body, afterwards entering the aspirating mouth (37) of the turbine. This canalization is established with the object of utilizing the depression created during the propulsion of the apparatus, in the form of the least resistance to the flight of the body. This depression may become very considerable when taking into consideration the probable propulsion speeds of the engine in determined flight conditions.

The second circuit starts in the opening (38) in the rear portion of the ceiling of the body. The air drawn in passes through a channel (39), in the form of a funnel, the lower part of which ends in the pipe (40), at the lower part of the motor (41) (shown by the dotted lines) which runs the turbines. The air, after having cooled the motor, enters by a pipe (42) into a channel (43), ending at the aspirating mouth (37) of the turbine.

The suppression of the turbine with vertical axis and its replacement by driving gear regulating the air exits of the turbines —the latter turning in the same direction of rotation—perceptibly decreases the weight of the apparatus and allows of a better arrangement of the interior of the cabin.

The mobile shields owing to their regulative driving gear allow all the manœuvres which can be desired or expected from an aerial engine of this kind: climbing, supporting, propulsion in all directions, and, finally, descent. For this last mentioned manœuvre, and in the event of a breakdown of the engine, the mobile shields can be completely effaced, leaving uncovered the lower half circle of the stator; the air which is engulfed causes the rotors of the turbines to revolve according to the well known Magnus effect, or auto-rotation of the paddles, thus mitigating to a certain extent the brusque fall of the apparatus deprived of its usual means of supporting.

When the shields are completely opened in such a manner that they uncover the exhaust opening of the turbines, a self-rotation of the rotors is produced, which permits, by means of a dissymmetric action of the air resistance on the pedals to retard the sudden descent of the airship in the case of a stoppage of the engine. When the oppositely disposed movable shields are positioned to completely close the outlet of the air from the turbines, this complete obturation of exhaust pressure openings permit a stocking of the power in the turbines working with an output null, and the excess of energy thus produced may be utilized for the lifting of the apparatus.

Having now described and ascertained in what manner the invention is to be performed, what I claim is:

1. An airship comprising a cabin-shaped body, a plurality of turbines arranged on a horizontal axis perpendicular to the longitudinal axis of said body, said turbines having rotors with inwardly curved vanes, and provided with central aspirating months and radially disposed exhaust pressure openings, remote control regulating means for said openings, and motive means for actuating said turbines.

2. An airship comprising a cabin-shaped body, a plurality of turbines arranged on a horizontal axis perpendicular to the longitudinal axis of said body, said turbines being provided with central aspirating mouths and radially disposed exhaust pressure openings, movable shields arranged in parallel relation to the peripheral surface of the stator of said turbines for adjustably closing said exhaust openings, means operatively connected to said shields and controllable from the pilot seat for moving said shields, and motive means for actuating said turbines.

3. An airship comprising a cabin-shaped body, a plurality of turbines arranged on a horizontal axis perpendicular to the longitudinal axis of said body, said turbines having central aspirating mouths and radially disposed exhaust pressure openings, oppositely movable shields arranged in parallel relation to the peripheral surface of the stators of said turbines for adjustably closing said exhaust openings, means operatively connected to said shields and controllable from the pilot seat for moving said shields to and from each other, and motive means for actuating said turbines.

4. An airship comprising a cabin-shaped body, a plurality of turbines arranged on the horizontal axis perpendicular to the longitudinal axis of said body, said turbines having central aspirating mouths and radially disposed exhaust pressure openings, remote control regulating means for said openings, a supplementary turbine vertically disposed with respect to said body and arranged upon the under side thereof, and means for actuating separately said turbines.

5. An airship comprising a cabin-shaped body, a turbine arranged at each side of the body and provided with an aspirating mouth and exhaust pressure opening, said turbines having the same horizontal axis and disposed perpendicularly to the longitudinal axis of said body, adjustable means associated with the exhaust pressure opening of the turbines to secure the suspension, propulsion and steering of the airship, and a motor with a disengageable driving gear for actuating said turbines.

6. An airship comprising a cabin-shaped body, a turbine arranged at each side of the body, each turbine having a rotor with inwardly curved vanes disposed backwardly of the rotation of movement, a stator fixed to the body, provided with a central aspirating mouth and having its lower portion formed with a semi-peripheral opening, and a pair of semi-circular slidable shields controllable at will to adjustably open and close said opening.

7. An airship comprising a cabin-shaped body, a turbine arranged at each side of the body and provided with an aspirating mouth and an exhaust opening, a pair of oppositely disposed movable shields for controlling the exhaust opening, a first radial arm having a toothed wheel mounted on the turbine shaft and connected to one of said shields, a second radial arm supported on said turbine shaft and carrying a pinion in engagement with the toothed wheel of the first arm, said second arm being connected to the remaining shield, a rotatable steering post operatively connected by means of ratchets and levers to said toothed wheel of the first arm, and means slidably supporting said steering post, whereby the shields of each turbine may be moved in the same or in opposed directions.

8. An airship comprising a cabin-shaped body, a turbine arranged at each side of the body and provided with an aspirating mouth and exhaust opening, an aspirating air conduit disposed in the interior of the fuselage of the airship, said conduit communicating with the exterior by means of openings disposed in the frame of the body and terminating in the aspirating mouth of the turbines, whereby to utilize for the suspension and propulsion of the airship, the depression of air produced by the rotation of the turbines, thereby lessening the resistance to the flight.

In witness whereof I have hereunto set my hand.

JEAN DE CHAPPEDELAINE.